United States Patent
Shirai et al.

(10) Patent No.: US 10,072,403 B2
(45) Date of Patent: Sep. 11, 2018

(54) HUMAN BODY DETECTION SENSOR AND AUTOMATIC FAUCET

(71) Applicant: Lixil Corporation, Tokyo (JP)

(72) Inventors: Yuki Shirai, Tokyo (JP); Azumi Kamata, Tokyo (JP)

(73) Assignee: Lixil Corporation, Tokyo (JP)

( * ) Notice: Subject to any disclaimer, the term of this patent is extended or adjusted under 35 U.S.C. 154(b) by 237 days.

(21) Appl. No.: 14/430,920

(22) PCT Filed: Jun. 13, 2013

(86) PCT No.: PCT/JP2013/066329
§ 371 (c)(1),
(2) Date: Mar. 25, 2015

(87) PCT Pub. No.: WO2014/050225
PCT Pub. Date: Apr. 3, 2014

(65) Prior Publication Data
US 2015/0259890 A1 Sep. 17, 2015

(30) Foreign Application Priority Data

Sep. 28, 2012 (JP) .................. 2012-217483
Dec. 28, 2012 (JP) .................. 2012-288860

(51) Int. Cl.
*E03C 1/05* (2006.01)
*G01S 17/48* (2006.01)
(Continued)

(52) U.S. Cl.
CPC ............ *E03C 1/057* (2013.01); *G01S 7/4808* (2013.01); *G01S 7/4813* (2013.01); *G01S 7/4815* (2013.01);
(Continued)

(58) Field of Classification Search
CPC .... G01S 7/4808; G01S 7/4813; G01S 7/4815; G01S 17/50; G01S 17/48; G01S 17/026; G01V 8/10; E03C 1/057
(Continued)

(56) References Cited

U.S. PATENT DOCUMENTS 5,458,147 A  10/1995 Mauerhofer
5,691,815 A  11/1997 Huber et al.
(Continued)

FOREIGN PATENT DOCUMENTS

CN  1118178 A  3/1996
CN  101393262 A  3/2009
(Continued)

OTHER PUBLICATIONS

Japanese Patent Office, International Search Report issued in corresponding International Patent Application No. PCT/JP2013/066329 dated Sep. 10, 2013.
(Continued)

*Primary Examiner* — Erin Deery
(74) *Attorney, Agent, or Firm* — Wood Herron & Evans LLP (57) ABSTRACT

A human body sensor has a light emitting portion to emit light to an object, a light reception portion to receive the light reflected from the object, a light reception amount determiner, a distance measurement determiner, a moving object determiner, and a detection determiner. When an amount of the reflected light is a threshold or more under the detection state, the detection determiner determines to switch the determination from the detection state to the non-detection state under a condition that the distance measurement determiner determines that the detection target does not exist, and when an amount of the reflected light is less than the predetermined threshold under the detection
(Continued)

state, the detection determiner determines to switch the determination from the detection state to the non-detection state under a condition that the moving object determiner determines that the object does not exist.

4 Claims, 9 Drawing Sheets

(51) Int. Cl.
*G01S 17/02* (2006.01)
*G01S 7/48* (2006.01)
*G01S 17/08* (2006.01)
*G01S 7/481* (2006.01)
*G01V 8/20* (2006.01)
*G01S 17/50* (2006.01)

(52) U.S. Cl.
CPC ............ *G01S 17/026* (2013.01); *G01S 17/08* (2013.01); *G01S 17/48* (2013.01); *G01S 17/50* (2013.01); *G01V 8/20* (2013.01)

(58) Field of Classification Search
USPC ......................................... 4/623; 251/129.04
See application file for complete search history.

(56) References Cited

U.S. PATENT DOCUMENTS

| | | | |
|---|---|---|---|
| 5,868,311 A * | 2/1999 | Cretu-Petra | E03C 1/057 236/12.12 |
| 6,250,601 B1 | 6/2001 | Kolar et al. | |
| 6,480,616 B1 | 11/2002 | Hata et al. | |
| 7,278,624 B2 * | 10/2007 | Iott | E03C 1/057 251/129.04 |
| 8,104,113 B2 * | 1/2012 | Rodenbeck | E03C 1/057 251/129.03 |
| 2006/0200903 A1 | 9/2006 | Rodenbeck et al. | |

FOREIGN PATENT DOCUMENTS

| | | |
|---|---|---|
| CN | 202302197 U | 7/2012 |
| JP | 2007322152 A | 12/2007 |
| JP | 2010127010 A | 6/2010 |
| JP | 2010148671 A | 7/2010 |
| WO | 2012043663 A1 | 4/2012 |

OTHER PUBLICATIONS

Guoying Fu, "Battery-type Sensor Faucet Production", Electronic Production, Issue 8, 2003, pp. 56-57.

European Patent Office, Search Report for European Patent Application No. 13842954.3 dated Jun. 9, 2016, 10 pages.

Chinese Patent Office, Office Action issued in Chinese Patent Application No. 201380050253.3 dated Jun. 29, 2016, 7 pages.

* cited by examiner

HUMAN BODY DETECTION SENSOR AND AUTOMATIC FAUCET

TECHNICAL FIELD

The present invention relates to a human body detection sensor optically detecting the human body.

BACKGROUND ART

Conventionally, an electronic faucet for kitchen use where a sensor surface of a touchless sensor of a non-contact type is disposed on an outer peripheral surface of a water discharge pipe has been realized (for example, refer to Patent Document 1). If this electronic faucet is used, since discharging and stopping water can be switched in a non-contact manner by waving a hand and fingers to the sensor surface, it is very convenient such as when a hand is wet. When arranging the sensor surface at a distal end side of the water discharge pipe, which is close to a spout, usability is improved since it is possible to operate the faucet at the front side without reaching the hand out beyond a sink.

On the other hand, when the dishes such as a large platter or pot are held by both hands, in order to switch the water discharge and the water stop, in each case, it is necessary to put the hand on the sensor surface after putting the washing on the counter top or the like. When the structure of an electronic faucet for a sink which starts discharging water only by putting one's hand into the water discharge space is used, since the water discharge is started by simply putting the washing into the water discharge space, there is a possibility to further improve user-friendliness.

However, it is not easily applicable for the automatic faucet for a sink, which performs detection by using reflected light returning when light is projected, to the kitchen use. There is a possibility that for example, when a transparent glass dish or the like is washed, sufficient reflected light cannot be obtained since light transmits the glass. Then, it is determined that the reflected light is not detected and the water supply is stopped during dishwashing in a decision of non-detection.

PRIOR ART DOCUMENTS

Patent Documents

[Patent Document 1] Japanese Unexamined Patent Application, First Publication No. 2010-127010

DISCLOSURE OF INVENTION

Problems to be Solved by the Invention

The present invention has been made in view of the above conventional circumstances, and provides a human body detection sensor which is applicable to an automatic faucet for kitchen use and has high detection performance, and an automatic faucet which has high operational reliability.

Means for Solving the Problems

The first aspect of the present invention is a human body detection sensor, which is a photoelectric sensor and includes a light emitting portion projecting a light to an object to be detected and a light reception portion receiving a reflected light caused by the light projected from the light emitting portion, the human body sensor including, a light reception amount determiner which determines whether an amount of the reflected light received by the light reception portion has a value of a predetermined threshold or more or a value less than the predetermined threshold, a distance measurement determiner which calculates a distance index representing a distance to the detection target or a degree of the distance using a reflected light entering the light reception portion, and determines the existence of the detection target depending on whether or not the distance index is included in a predetermined range, a moving object determiner which detects a temporal change of the reflected light entering the light reception portion and determines whether or not the moving object exists, and a detection determiner which determines whether the detection state where the detection target is detected or the non-detection state. When the light reception amount of the reflected light under the detection state is the predetermined threshold or more, the detection determiner switches the determination from the detection state to the non-detection state under a condition that the distance measurement determiner determines that the detection target does not exist, and when the light reception amount of the reflected light under the detection state is less than the predetermined threshold, the detection determiner switches the determination from the detection state to the non-detection state under a condition that the moving object determiner determines that the moving object does not exist.

The second aspect of the present invention is an automatic faucet, including an faucet which discharges water to a sink provided with a drain outlet at a bottom portion, a human body detection sensor according to the first aspect of the present invention, and a water supply controller which performs switching discharge or stop the water of the faucet or an adjustment of a water discharge volume in response to a sensor signal outputted by the human body detection sensor.

In addition to the determination of the existence of the detection target based on the distance determination regarding the distance index, the human body detection sensor according to the present invention is a sensor which can execute the determination whether or not the moving object exist.

In order to determine the distance index to be applied to the distance determination, the reflected light reflected and returned from a relatively small region is appropriate. When a region where the light is projected is wide, it is likely that not only the detection target but also other objects such as background materials are included in the region. In the situations where other objects other than the detection target are included in the region where the light is projected, a sufficient accuracy of the distance index cannot be provided or the distance index is hardly obtained.

When projecting the light toward a relatively narrow region in order to determine the distance index, sufficient reflected light is not returned although the detection target exists. In such a case, there is a possibility that the accuracy of the distance index is decreased, and the determination of whether or not a detection target exists becomes unstable. For example, in the case of an automatic faucet for kitchen use, when washing a glass cup or the like, the projected light is transmitted through the cup, or the reflected light is insufficient due to diffuse reflection caused by water containing air bubbles. In addition, when washing a stainless kitchen knife, there is a possibility that a traveling direction of the reflected light from a sharp mirror surface of the knife is deviated and does not enter the light reception unit. As described above, the accuracy of the distance index is affected by a surface quality and the like due to a posture, a material and the like of the detection target. If the accuracy of the distance index is decreased, the accuracy of the determination of whether or not there being the detection target using the distance index is decreased.

In the human body detection sensor according to the present invention, upon switching to the non-detection state from the detection state, two kinds of determination methods, in particular, the determination of the existence of the detection target based on the distance index as described above and the determination of the existence of the moving object, are combined. The detection accuracy of the human body detection sensor is improved by combining the two types of determination methods. The two types of determination methods are selectively used depending on the amount of received light under the detection state being the predetermined threshold or more or less than the predetermined threshold.

In a situation where the amount of received light of the reflected light under the detection state is the threshold or more and thus the accuracy of the distance index is easily to be secured, it is switched to the non-detection state in accordance with the determination result of whether or not the detection target existing based on the distance index. On the other hand, in a situation where the amount of received light of the reflected light under the detection state is less than the threshold and thus the accuracy of the distance index is hard to be secured, it is switched to the non-detection state in accordance with the determination result of whether or not the moving object existing. In general, in the determination of the moving object using the reflected light, determination errors are highly influential that are caused by ambient light changing every moment such as the light which is not blocked by a curtain since the curtain sways in the wind or the light of sunshine filtering through foliage. However, under the detection state where the detection target exists, the possibility of the occurrence of the determination errors is low since the ambient light described above is likely to be blocked by the detection target.

As described above, in the human body detection sensor according to the present invention, the two types of determination methods are selectively used depending on the entrance condition of the received light under the detection state. Therefore, in particular, it is an excellent sensor in which a detection performance under the detection state is improved. In an automatic faucet employing the human body detection sensor, there is a low possibility that the discharge of water during use is stopped by switching to the water stopping state, and thus, the faucet has a high operational reliability.

As a light reception portion included in the human body detection sensor according to the present invention, in addition to the PSD, the imaging devices such as CMOS or CCD is employed. When the light reception portion measuring the light amount without having a positional resolution is employed, the light amount of the reflected light may be used as the distance index.

The human body detection sensor according to the present invention can be applied to an automatic faucet of a wash basin, an automatic faucet for kitchen use, an automatic water supply device of a urine toilet having an automatic cleaning function, and the like. In addition, the human body detection sensor according to the present example may be applied to a variety of automated devices such as lighting which automatically lights up in response to a human body and a shielding operation by hands.

In the human body detection sensor according to the present invention, as the threshold of the amount of received light, it is preferable to set the threshold level that can ensure the accuracy of the distance index. For example, when an imaging device such as CMOS or CCD is employed, as a target pixel subjected to the threshold determination of the amount of received light, a pixel exhibiting the maximum value of the amount of received light, a pixel corresponding to a particular position such as the gravity center of the waveform of the received light and the like can be selected. The threshold determination of the amount of received light may be performed regarding a waveform of the received light after a low-pass filter is applied. In this case, it is possible to suppress the influence of pixels exhibiting excessive amount of received light accidentally. Furthermore, it is possible to determine the threshold for the total received light amount of the waveform of the received light.

In the detection determiner of the human body detection sensor of an preferred aspect according to the present invention, when the distance measurement determiner determines that the detection target does not exist under the non-detection state, the detection determiner maintains the determination of the non-detection state, and when the distance measurement determiner determines that the detection target exists under the non-detection state, the detection determiner switches the determination from the non-detection state to the detection state regardless of whether or not determination results by the moving object determiner is obtained or regardless of the determination results.

The determination of whether or not the moving object exists can be unstable because of the light of sunshine filtering through foliage, the light which is not blocked by a curtain since the curtain sways in the wind, and the like. On the other hand, it is possible to determine the existence of the non-detection object with high reliability under the non-detection state according to the distance determination. When the configuration as described above is employed, the possibility of switching the determination from the non-detection state to the detection state can be reduced in advance.

In the human body detection sensor of an preferred aspect according to the present invention, when the light reception amount of the reflected light under the detection state is less than the predetermined threshold, the moving object determiner determines that the moving object exists, thereby, the detection determiner has determined not to switch to the non-detection state, and when the determination occurs continuously over a predetermined number of times or the determination is maintained continuously over a predetermined time, the detection determiner switches the determination from the detection state to the non-detection state regardless of whether or not determination results by the moving object determiner is obtained or regardless of the determination results.

In a situation such that the detection target exists and the detection target moves, even if the situation where the reflected light is not sufficient occurs, it is likely that the situation is temporary and does not continues longer. In particular, the determination that while the amount of reflected light is insufficient, the moving object exists is not likely to occur continuously or to continue longer. If the determination such that switching to the non-detection state is not performed based on the determination that the moving object exists as described above occurs continuously or continues over a long period, it is highly likely that the determination that the moving object exists occurs by "something" other than the detection target.

For example, when an automatic faucet for kitchen use is used and a bowl filled with water and the like is left in the sink, there is a possibility that the determination which the moving object exists is repeated due to vibrations of the surface of the water in the bowl, and thus, the determination of not to switch to the non-detection state can occur continuously. Therefore, when such determination occurs continuously or is maintained over a long time, it is preferable to switch the determination to the non-detection state regardless of determination results and the like from the moving object determiner.

On the other hand, for example, during the operation of washing a glass cup and the like where the moving object determination is effective as described above, due to the motion of a glass cup, the hand motion or the like, a situation that the reflected light becomes sufficient and a situation that the reflected light becomes insufficient are repeated alternately. During the operation of washing a glass cup and the like, there is a low possibility that the determination of not switching to the non-detection state based on the determination such that the moving object exists although the amount of reflected light is insufficient occurs continuously or is maintained over a time. Therefore, if a condition, in which such determination occurs continuously over a predetermined number of times or the determination is maintained continuously over a predetermined time, is set as a condition of switching to the non-detection state, switching to the non-detection state is performed and the water discharge is not stopped during the washing operation.

In the light emitting portion of the human body detection sensor of an preferred aspect according to the present invention, the light emitting portion comprises a first light emitting portion which is arranged in offset with respect to the light reception portion and projects a slit light in which a light spreading to a offset direction is reduced, and a second light emitting portion which projects a light spreading at least to the offset direction. The light reception portion has a resolution in the offset direction regarding the light entering position, the distance measurement determiner determines the distance index by identifying an entering position with respect to the light reception portion regarding a reflected light occurred by the light projected by the first light emitting portion, and the moving object determiner determines whether or not the moving object exists using a reflected light occurred by the light projected by the second light emitting portion.

The slit light in which the light spreading to the offset direction is reduced by the first light emitting portion is suitable for a distance measurement based on the principle of triangulation. The slit light in which the light spreading to the offset direction is reduced by the second light emitting portion can form a wide region, in which the determination of the moving object can be performed, in the offset direction. Regarding the light of the second light emitting portion, preventing the spread of the light in the direction perpendicular to the offset direction is effective to improve the determination accuracy of the existence of the moving object.

The moving object determiner of the human body detection sensor of a preferred aspect according to the present invention determines whether a movable object exists or not by determining a threshold value related to a temporal displacement amount of an incident position of a light entered the light reception unit.

In this case, a configuration that calculates a light incident position with respect to the light reception unit can be shared by the distance measurement determiner and the moving object determiner. Then, hardware resources or software resources can be utilized efficiently, and thus, the cost of the hardware, the development cost of the software, or the like can be reduced to realize cost-attractive products.

The light reception unit of the human body detection sensor of a preferred aspect according to the present invention is shared by the first light emitting unit and the second light emitting unit, and the second light emitting unit is arranged in a gap of the offset direction between the first light emitting unit and the light reception unit.

If the light receiving portion is shared, the cost of the human body detection sensor can be reduced and the size thereof also can be reduced. In addition, when the second light emitting unit is arranged between the first light emitting unit and the light reception unit, a gap in the offset direction can be used efficiently and the configuration is useful to reduce the size of the human body detection sensor.

EMBODIMENTS FOR CARRYING OUT THE INVENTION

Each exemplary embodiment of the present invention is described in detail with reference to the following examples.

Example 1

The present example shows an example of a human body sensor 1 applied to a faucet (automatic faucet) 16 of a kitchen counter 15. The details are described with reference to FIGS. 1 to 12.

Figure 1:
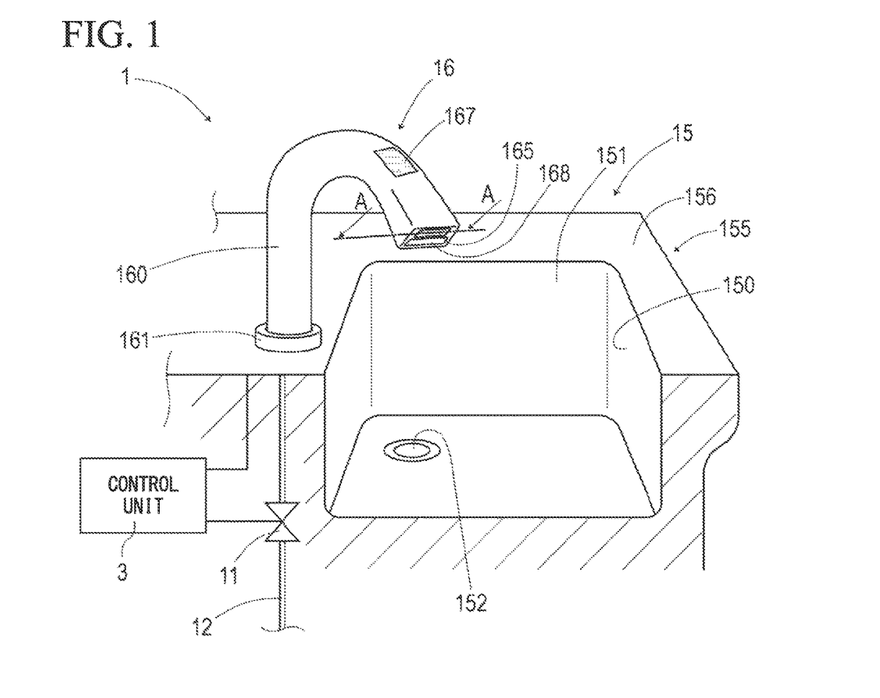
FIG. 1 is a cross-sectional perspective view showing a kitchen counter including an automatic faucet in Example 1.

The kitchen counter 15 of the present example includes, as shown in FIG. 1, a counter 155 provided with a sink 151 which is recessed and has concave shape, and a faucet 16 having a water discharge port 168. The faucet 16 is erected on the countertop 156 which forms an upper surface of the counter 155. The sink 151 includes a drain 152 at the deepest portion thereof.

The faucet 16 includes a water discharge pipe 160 which discharges water. The water discharge pipe 160 is erected on the countertop 156 with interposing a base portion 161 which forms a base. The water discharge pipe 160 is bent in a substantially J-shape, and the end thereof is toward the sink 151. Linear portions continuing to the base portion 161 of the water discharge pipe 160 has a cross-sectional shape of a substantially circular shape. In contrast, a front end surface toward the sink 151 has a substantially rectangular shape. The cross-sectional shape of the water discharge pipe 160 is changed smoothly from a portion, which is subsequent to a curve portion, to a front end, and thereby, the cross-sectional shape is changed to a rectangular shape from a circular shape.

On the upper surface of the water discharge pipe 160, a sensor surface of a touchless sensor 167 of the non-contact type is provided. The touchless sensor 167 is a photoelectric proximity sensor where a light emitting element and a light reception element such as a phototransistor are combined. When the reflected light from hands or fingers which approaches the detection range of several cm from the sensor surface is received by the light receiving element, the touchless sensor 167 determines that the light is detected. If the hands or fingers shields sensor surface, it is possible to switch discharging water and stopping water alternatively in response to the detection by the touchless sensor 167.

At the distal end surface of the water discharge pipe 160 having a substantially rectangular shape, as shown in FIG. 1, a filter plate 165 that forms the detection surface of the human body detection sensor 1 is disposed at the upper side and a water discharge port 168 having a substantially rectangular shape is disposed at the lower side. A sensor unit 2 which configures the human body sensor 1 (see FIG. 2) is arranged inside the water discharge pipe 160, which is a rear side of a filter plate 165 made of a resin selectively transmitting light in the infrared region.

The faucet 16 of the present example is characterized in that in addition to the touchless sensor 167, including a sensor unit 2 incorporated into the distal end of the water discharge pipes 160. If there is no sensor unit 2, when large dishes or pans that need to be supported by both hands are washed, it is necessary to once put the dishes or pans in the counter top 156, and then to shade the sensor surface of the touchless sensor 167 with the hand. On the other hand, in the faucet 16 of the present example where the sensor unit 2 is incorporated into the tip of the water discharge pipe 160, the water discharge can be started by the operation of inserting the dishes or the pans supported with both hands into a water discharge space at the front end side of the water discharge pipe 160. When the dishes have finished, the water can be stopped only be pulling out the dishes, pans, or the like from the water discharge space, which is convenient.

Figure 2:
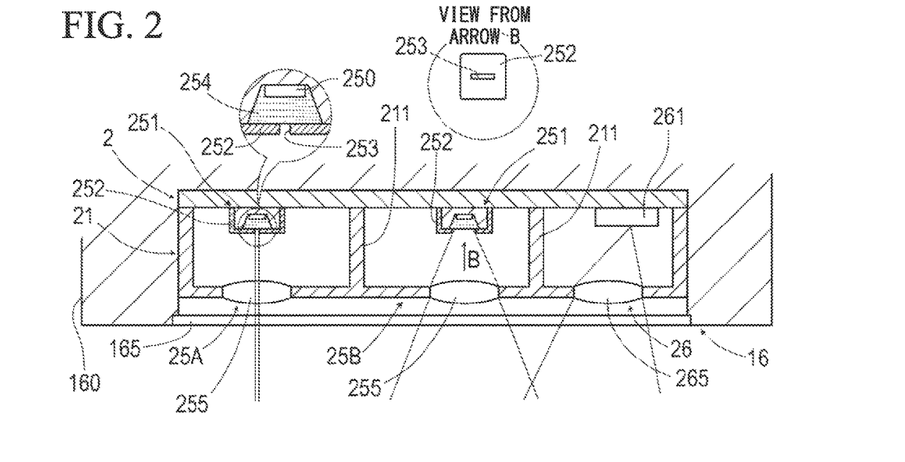
FIG. 2 is a cross-sectional view showing a cross-sectional structure of the sensor unit in Example 1 (a cross-sectional view taken along line A-A in FIG. 1).

As shown in FIGS. 1 and 2, the human body detection sensor 1 of the present Example is configured by the sensor unit 2 which is incorporated into the faucet 16 and a control unit 3 which controls the sensor unit 2. In the kitchen counter 15, an automatic water supply device is formed by a combination of the human body detection sensor 1 and a solenoid (water supply controller) 11 which is a water discharge valve (solenoid valve) provided at the water supply pipe 12.

As shown in FIGS. 1 and 2, the sensor unit 2 is a unit where two LED elements 251 and one line sensor (imaging sensor) 261 are accommodated in a housing 21 and operates by receiving a power supply from the control unit 3. In the sensor unit 2, a first light emitting unit 25A for measuring a distance which is used in a distance measurement determiner 321 described below, a second light emitting unit 25B for determining existence of a moving object that is used in a moving object determiner 322 described below, and an imaging unit (light reception unit) 26 used in common by the light emitting unit 25A and the light emitting unit 25B are arranged in parallel facing the filter plate 165 of the faucet 16.

Both the light emitting units 25A and 25B emitting infrared light are formed by projection lens 255 and the LED device 251. The imaging unit 26 is constituted by a condenser lens 265 and the line sensor 261. The imaging unit 26 and the light emitting units 25A and 25B are arranged in offset horizontally (offset direction corresponds to the left-right direction in FIG. 2) across the partition wall 211 having a light-shielding characteristic. The imaging unit 26 and the light emitting unit 25A are disposed at both sides of the light emitting unit 25B, and in the gap between the imaging unit 26 and the light emitting unit 25A, the light emitting unit 25B is disposed close to the imaging unit 26.

As shown in FIG. 2, the LED element 251 is a light emitting element including an LED chip 250. The LED chip 250 is mounted in a cavity of the package substrate, and is sealed by a transparent resin 254. In the light emitting unit 25A and 25B, an LED element 251 is covered by an element case 252 with the light-shielding characteristic having a slit 253. The first light emitting unit 25A for measuring a distance and the second light emitting unit 25B for determining existence of a moving object are different in an arrangement direction of the slit 253. Based on the light emitting unit 25A having the slit 253 in the vertical direction, it is possible to project sharp light in which a divergence angle in the horizontal direction is reduced toward the detection target. Based on the light emitting unit 25B having the slit 253 in the horizontal direction, a divergence angle in the vertical direction is reduced and it is possible to project light spreading in the horizontal direction toward the detection target.

Figure 3:
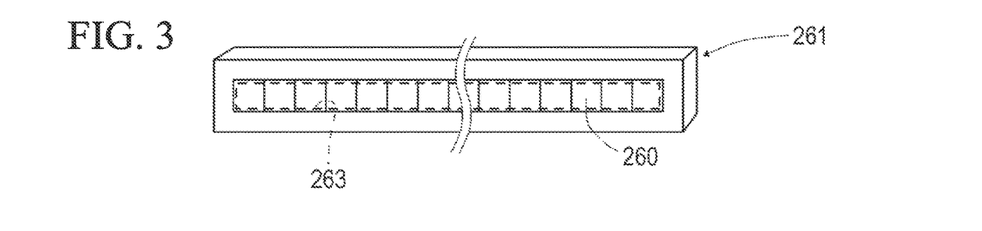
FIG. 3 is a perspective view showing a line sensor in Example 1.

As shown in FIGS. 2 and 3, the line sensor 261 is a one-dimensional imaging sensor where pixels 260 which convert the amount of received light to the electrical physical quantity are arranged linearly. The line sensor 261 includes sixty-four pixels 260 as active pixels. In the line sensor 261, a light reception region 263 is constituted by these sixty-four pixels 260. The line sensor 261 includes an electronic shutter which is not shown, and light reception (exposure) time can be adjusted by using the electronic shutter. The line sensor 261 synchronizes the light emitting operation of the light emitting unit 25A or the emitting portion 25B and outputs image data each time the light receiving operation is performed. The image data of the present example is one-dimensional digital data where pixel values of 256 gradations corresponding to the light reception amount are arranged in order of each pixel 260. In the sensor unit 2 of the present example, the line sensor 261 is incorporated such that a longitudinal direction of the light reception region 263 corresponds to an offset direction of the imaging unit 26 and the light emitting units 25A and 25B.

Figure 4:
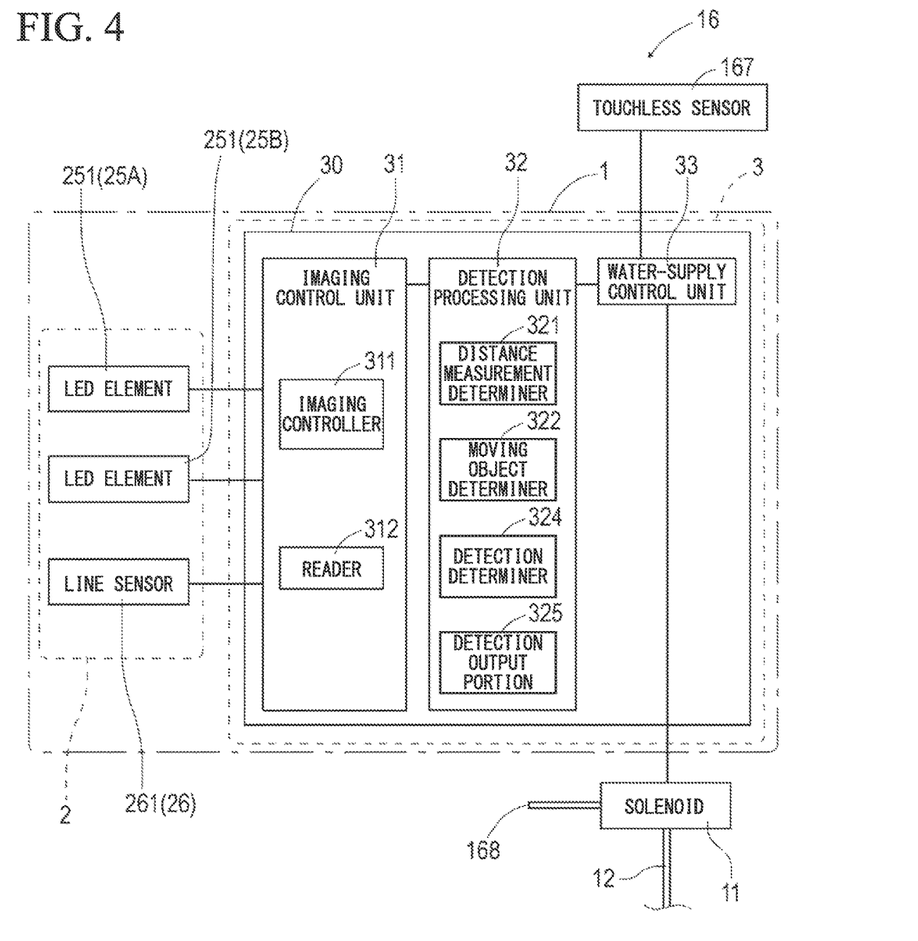
FIG. 4 is a block diagram showing a system configuration of a human body detection sensor in Example 1.

As shown in FIGS. 1 and 4, the control unit 3 is a unit which controls the solenoid 11 and the sensor unit 2, and the control unit 3 is operated by receiving power from the commercial power source. The control unit 3 includes a control board 30 which controls the sensor unit 2 and the solenoid 11. The control board 30 is provided with the imaging controller 31, which controls two LED elements 251 and the line sensor 261, a detection processing unit 32 which executes the detection process, and a water supply control unit 33 which controls the solenoid 11.

The imaging controller 31 has a function of the imaging controller 311, which controls two LED elements 251 and the line sensor 261, and a reader 312 which reads out the image data from the line sensor 261.

The imaging controller 311 controls the line sensor 261 such that an intermittent operation where the non-operation period and the operation period in which the imaging operation is performed occur alternatively. The imaging controller 311 stops the power supply to the line sensor 261 until the predetermined time has elapsed after the previous operation period completed (in the present example, approximately 0.3 to 0.5 sec) to set the non-operation period, and restarts the power supply after the predetermined time has elapsed to set the operation period.

In one imaging operation, the imaging controller 311 continuously executes the light reception (exposure) from the line sensor 261 synchronized with the light emission (LED light) of the LED device 251 and the light reception (exposure) of the line sensor 261 under no emissions. Then, the light reception amount of the difference between the two light receptions is calculated for each pixel. In the waveform of the received light of the difference, an influence of the ambient light is reduced, and a component of the reflected light due to the LED light is extracted.

The detection processing unit 32 includes functions as a distance measurement determiner 321 and a moving object determiner 322 which are execution units of a detection process, a detection determiner 324 which determines whether or not a state is under a detection state or a non-detection state, and a detection output portion 325 which outputs a detection signal (sensor signal) under the detection state.

The distance measurement determiner 321 determines whether or not a detection target exists by using the principle of triangulation based on an incident position (distance index) of the reflected light corresponding to the emission of the light emitting unit 25A. The distance measurement determiner 321 identifies the incident position of the reflected light using the waveform of the received light (the imaging data showing the distribution of the light reception amount of each pixel 260) of FIG. 5 that is obtained in accordance with a single imaging operation including the light emitting operation of the light emitting unit 25A (appropriately referred to as an imaging operation of the distance measurement), and determines whether or not the detection target exists by whether or not the incident position being within the predetermined detection region. The horizontal axis x of the drawing shows the pixel number (pixel position), and the vertical axis D(x) shows the light reception amount (pixel value) of the pixel 260 of the pixel number x.

The distance measurement determiner 321 of the present example regards the gravity center position of the waveform of received light as an incident position. When identifying the gravity center position, first, as shown in FIG. 6, the data D(x) of the light reception amount for each pixel, which constitutes the waveform of the received light, is integrated, and the total sum SD of the pixel values of sixty-four pixels is calculated. The total sum SD corresponds to an area indicated by downward-sloping hatched lines in FIG. 6. A position of a pixel of the pixel number N (shown by a black circle) when an integrated value reaches SD/2 is calculated as a gravity center position of the waveform of the received light. The integrated value is obtained by integrating a pixel value of each pixel 260 in the order from a pixel 260 having the pixel number 0 that is the left end of the light reception region 263. Here, the integrated value SD/2 corresponds to an area indicated by right-upward-sloping hatched lines. The area is included in an area of the total sum SD, and in the same drawing, the area is shown by a cross-hatching. The distribution of the light reception amount by each pixel of FIG. 6 schematically shows the waveform of the received light of FIG. 5.

Figure 6:
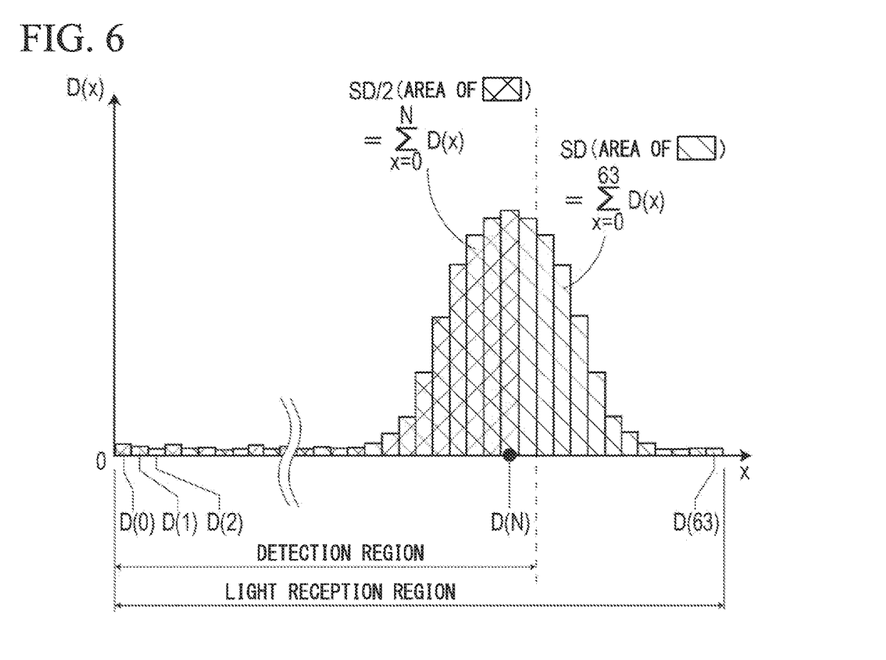
FIG. 6 is a diagram showing a method of calculating a gravity center position of a waveform of a received light and a detection method in Example 1.
Figure 7:
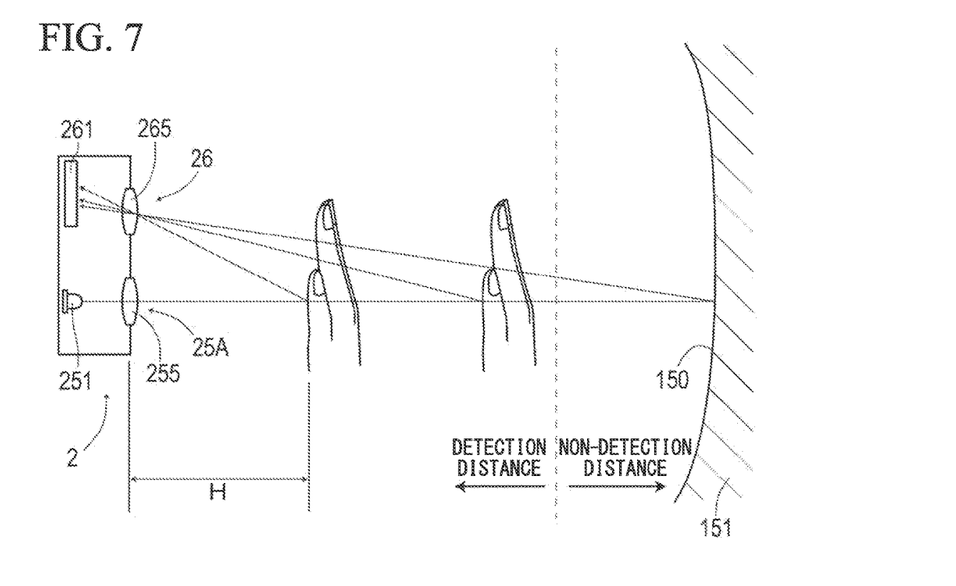
FIG. 7 is a diagram describing the principle of triangulation in Example 1

The principle of triangulation used by distance measurement determiner 321 is described with reference to FIG. 7 which schematically shows the positional relationship of the sensor unit 2 at the kitchen counter 15 of the present example, the inner surface 150 of the sink 151, and the user's hands. In the drawing, while the light emitting unit 25A and the imaging unit 26 are shown, the light emitting unit 25B for determining existence of a moving object is not shown. When the reflected light caused by a hand which is an object to be detected among LED lights is incident to the line sensor 261, an incident position (distance index) varies depending on the distance H from the imaging unit to the object to be detected. The shorter is the distance H, the further becomes the incident position of the reflected light which is incident to the line sensor 261 away from the light emitting unit 25A, and the longer is the distance H, the closer becomes the incident position to the light emitting unit 25A. Thus, the incident position of the reflected light with respect to the line sensor 261 is proportional to the distance from the imaging unit to the object to be detected, and the incident position can be a distance index representing the degree of the distance. The detection region provided in the light reception region 263 (FIG. 6) corresponds to a detection distance to be detected (FIG. 7). The gravity center position calculated as described above is assumed to be the incident position. The determination whether or not the gravity center position is within the detection region is substantially analogous to the determination whether or not the distance to the object to be detected which causes the reflected light is within the detection distance shown in FIG. 7.

The moving object determiner 322 determines whether or not the moving object exists by using a temporal change of the reflected light in response to the light emission of the light emitting unit 25B. The moving object determiner 322 determines whether or not the moving object exists by comparing two waveforms of the received light which are obtained by two temporally consecutive imaging operations (referred to appropriately as an imaging operation of the moving object determination).

In the moving object determiner 322 of the present example, for each of the two waveforms of the received light corresponding to either of the two imaging operation, a gravity center position is obtained by the same calculation method as described with reference to FIG. 6 and is regarded as an incident position of the waveform of the received light. When the displacement amount of the two calculated gravity center positions exceeds a predetermined threshold value, it is determined that the moving object exists, and when the displacement amount is less than the predetermined threshold value, it is determined that the moving object does not exist.

Hereinafter, by using the flowchart of FIG. 8, the operation of the human body detection sensor 1, which is implemented by the control of the control unit 3, is described.

Figure 5:
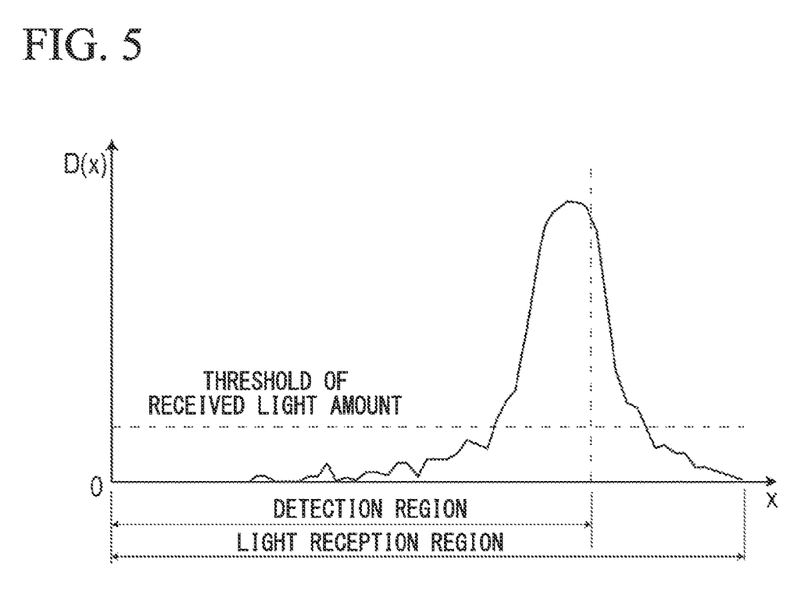
FIG. 5 is a diagram showing an example of a waveform of received light of reflection light when light from the first light emitting unit is projected in Example 1.

Once the power is on, first, the routine of obtaining waveform of received light that includes an imaging operation of measuring a distance described above is performed (P101), and the routine of determining a measurement distance (P102) is performed using an obtained waveform of received light (see FIG. 5). In the routine of determining a measurement distance, the gravity center position of the waveform of the received light (see FIG. 6) is identified as an incident position of the received light, and whether or not the gravity center position is in a predetermined detection region (see FIG. 6) is determined. If the gravity center position is in a predetermined detection region and a distance to a detection target is within a predetermined detection distance (S103 YES), the output of the detection signal in response to the determination that there exists the detection target is started, and the water discharge is started (S104).

While discharging water, i.e., under the detection state, every time the predetermined period of an interval has elapsed to switch to the operation period, the routine of obtaining a waveform of the received light including the imaging operation of measuring a distance and the imaging operation of the moving object determination is executed (P105). In this routine, it is obtained that the waveform of the received light of measuring a distance corresponding to an imaging operation for measuring a distance and the waveform of the received light of the moving object determination corresponding to an imaging operation for the moving object determination. In particular, as the waveform of the received light of the moving object determination, temporally successive two waveforms of the received light are obtained.

First, by using the waveform of the received light for the distance measurement, it is determined that whether or not the received light amount at a peak thereof is over the predetermined threshold value (S106). As shown in FIG. 9, when the reflected light caused by a dish during dishwashing is entered the sensor unit 2, if the received light amount of any one of the pixels 260 has a threshold value or more (S106: NO), the waveform of the received light continues to use and the routine of determining measurement distance similar to P102 described above is performed (P117). If the center gravity position (incident position) is within the predetermined detection region and the distance to the detection target is within the predetermined detection distance (S118 YES), detection signals are continued to be output in accordance with the determination result showing that the detection target exists and the water discharge is continued (S119).

Figure 10:
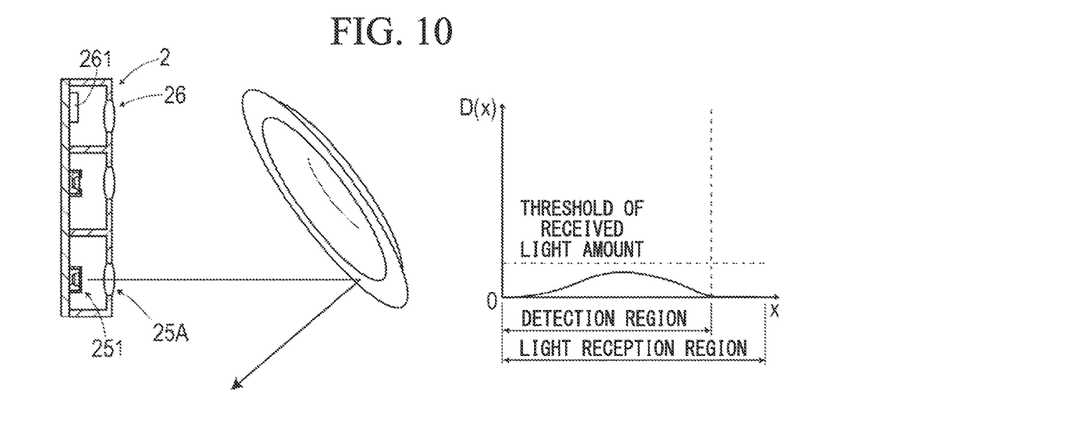
FIG. 10 is the second diagram showing an example of a reflected light generated under a detection situation and a waveform of the reflected light received by a light reception portion in Example 1.
Figure 11:
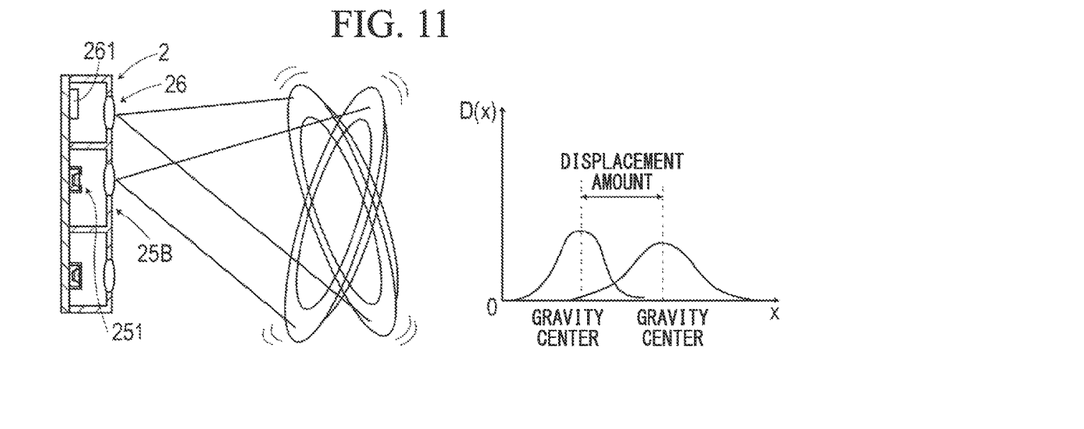
FIG. 11 is the third diagram showing an example of a reflected light generated under a detection situation and a waveform of the reflected light received by a light reception portion in Example 1.

On the other hand, as shown in FIG. 10, when the pixel 260 having the light reception amount of the threshold value or more does not exist (S106: YES) since a traveling direction of the reflected light caused by a dish during dishwashing is deviated and the reflected light does not enter the sensor unit 2, by using two waveforms of the received light for determining the existence of the moving object, the routine of determining the existence of the moving object is executed (P107). In the routine of determining the existence of the moving object, as shown in FIG. 11, regarding each of the two temporally continuous waveforms of the received light for determining the existence of the moving object, a gravity center position is calculated. If the displacement amounts of these gravity center positions have values of a predetermined threshold or more, it is determined that the moving object exists (S108: NO).

It should be noted that as a situation in which the light reception amount of the pixels 260 in S106 is less than the threshold value, in addition to the condition described above, the situations are possible such that a detection target does not exist, the projected light is transmitted through the plate made of glass or the like, and the projected light is diffusely reflected by the air bubbles or the like included in the water for washing a cup and the like. In addition, there is a high possibility of occurring the situation, in which a traveling direction of the reflected light is deviated and the reflected light does not enter the sensor unit 2 as described above, when the reflected light is a sharp-mirror reflected light caused by an object having a mirror surface such as a stainless kitchen knife and a silver plate tableware.

If it is determined that the moving object exists in step S108 (NO in S108), the output of the detection signal is continued and the water discharge is continued (S119). In this case, the process proceeds to the routine of obtaining the waveform of the received light in P105, then a series of processes from P105 to S119 are repeated until the detection target is not detected.

When it is determined that the moving object does not exist in Step S108 (S108: YES), it is determined that it is in a non-detection state to stop outputting the detection signal, and is switched to stopping water (S109). In this case, until the detection target is detected after proceeding to the routine P101 of obtaining waveform of received light, a series of processing P101 to S103 is performed repeatedly.

Here, a tendency of the determination based on the routine of determining measurement distance such as Step P117 and the routine of determining the existence of the moving object in Step P107 is described.

According to the routine of determining measurement distance which determines whether or not there is the detection target by using the gravity center position of the reflected light (incident position), regardless of the reflectance and color of the detection target, it is possible to detect the detection target reliably. On the other hand, if transparent glass tableware, a dish covered with a bubbly water layer, and the like is used, it may be impossible to obtain a sufficient reflected light since the LED light is transmitted or diffusely reflected. When the sufficient reflected light is not obtained, since it is hard to accurately identify the gravity center position, the determination accuracy of the distance measurement determination unit 321 tends to be decreased.

In such a case, the routine of determining the existence of the moving object works effectively. Any glass tableware or any dish whose surface is covered with a water layer, fine movement has occurred constantly during the dishwashing. In the middle of such fine motion, even though it is glass tableware, the glass reflects the LED light in accordance with a posture thereof and the portion at which the LED light is reflected momentarily changes. Thus, the temporal changes of the reflected light occur. According to the routine of determining the existence of the moving object which determines whether or not the moving object exists in response to the temporal changes of the reflected light as described above, the determination in the glass tableware and the like during dishwashing can be performed relatively easily.

As described above, the human body detection sensor 1 of the present example is a sensor realizing an improvement of the detection performance by suitably combining advantages of the distance measurement determiner 321 performing the routine of determining measurement distance and the moving object determiner 322 performing the routine of determining the existence of the moving object. In the non-detection state corresponding to stopping the water discharge of the faucet 16, the detection determination is performed by using only the distance measurement determiner 321, and an erroneous detection is avoided in advance. On the other hand, in the detection state corresponding to discharging the water of the faucet 16, the determination performed by the distance measurement determiner 321 and the determination performed by the moving object determiner 322 are combined. When the light reception amount is over the threshold under a detection state, the determination result from the distance measurement determiner 321 is used as priority of the determination of switching to non-detection state, and when the light reception amount is less than the threshold under a detection state, the determination result from the moving object determiner 322 is used as priority of the determination of switching to non-detection state.

According to the body detection sensor 1, for example, during washing a glass cup using a faucet for the kitchen, even when the distance cannot be determined stably since the projected light (LED light) transmits the cup and the sufficient reflected light is not returned, it is possible to maintain the detection state based on a moving object determination. Therefore, in spite of in the middle of washing a cup, switching to the non-detection state and thereby stopping the water discharge can be avoided in advance.

As described above, the human body detection sensor 1 of the present example is a sensor having an improved detection performance by combining the determination that determines whether or not the detection target exists based on a distance and the moving object determination. In particular, by using the moving object determination under the detection situation, a detection performance is secured even when a reflected light from a detection target is not sufficient, and the false determination determining a state as a non-detection state although the detection target exists is reduced. The faucet 16 provided with the above human body detection sensor 1 is a product with excellent operational reliability and is suitable for an automatic faucet for kitchen use.

The present example employs an electronic shutter to control the length of the exposure time of the line sensor 261. The electronic shutter is not always necessary and can be omitted; however, instead of an electronic shutter, a mechanical shutter which physically blocking the light incident on the line sensor 261 may be employed.

When there are sensitivity variations in each pixel 260 of the line sensor 261, the detection processing may be executed after correcting a pixel value of each pixel 260.

In the present example, as the incident position of the reflected light, the gravity center position of the waveform of the received light is used. Instead of the gravity center position, a peak position of the waveform of the received light may be specified as the incident position. In addition, in the present example, the gravity center position is calculated by a simplified calculation; however, the gravity center position may be calculated by an exact mathematical calculation if calculation processing capability allows.

The present example shows an example of applying the human body detection sensor 1 to the kitchen counter 15; however, it may be applied to a faucet of a sink. In addition, as a sensor of an automatic water supply device of urinating toilet with an automatic cleaning function, the human body detection sensor 1 of the present example is also applicable.

Furthermore, the human body detection sensor 1 of the present example is also applicable to various automatic devices such as an automatic door and a lighting which automatically turns on in response to a shading operation or a human body.

In the present embodiment, the sensor unit 2 and the control unit 3 are formed separately. Alternatively, the sensor unit 2 and the control unit 3 can be formed integrally and accommodated in the faucet 16.

In addition, the human body detection sensor 1 of the present example includes the water supply control unit 33; however, the water supply control unit 33 may be formed separately.

The sensor unit 2 of the present example is a compact unit that is configured such that the imaging unit (light reception unit) 26 is used in common by the light emitting unit 25A and the light emitting unit 25B. Alternatively, the light reception unit may be provided at each light emitting unit. As the light reception portion 26 corresponding to the light emitting unit 25B of the moving object determination, a light reception portion including a PSD device which can output the gravity center position of the waveform of the received light may be used. Since it is not necessary to determine the gravity center position by the calculation, it is possible to reduce the calculation load for the moving object determination.

Further, in the sensor unit 2 of the present example, the imaging unit 26 and the light emitting units 25A and 25B are arranged onto a straight line. While the light emitting unit 25A for measuring a distance needs to be arranged in off-set in the horizontal direction with respect to the imaging unit 26, the light emitting unit 25B for determining existence of a moving object may be arranged at any places as long as it is arranged around the imaging unit 26. Regarding the light emitting unit 25B, it is preferably arranged closer to the imaging unit 26 than the light emitting unit 25A.

Figure 8:
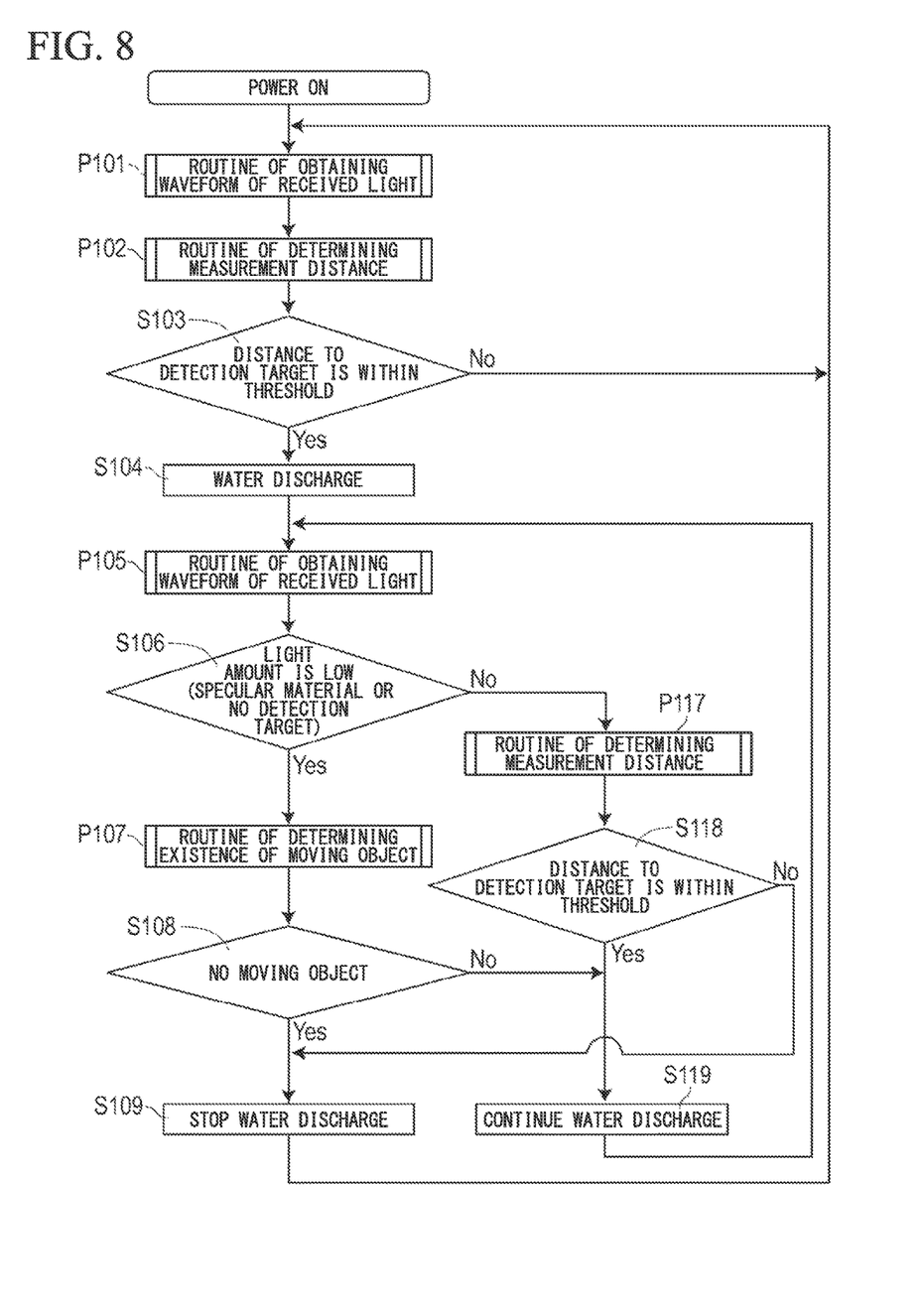
FIG. 8 is a flow diagram showing a flow of a detection process in Example 1.
Figure 9:
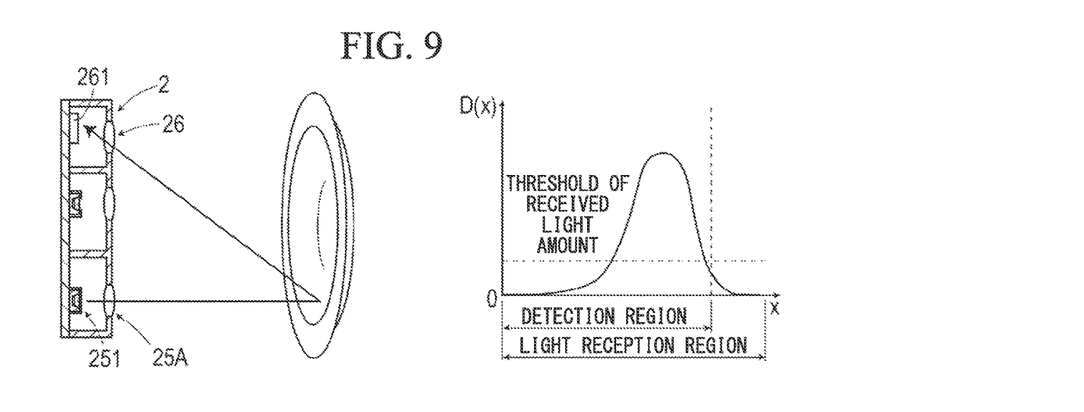
FIG. 9 is the first diagram showing an example of a reflected light generated under a detection situation and a waveform of the reflected light received by a light reception portion in Example 1.
Figure 12:
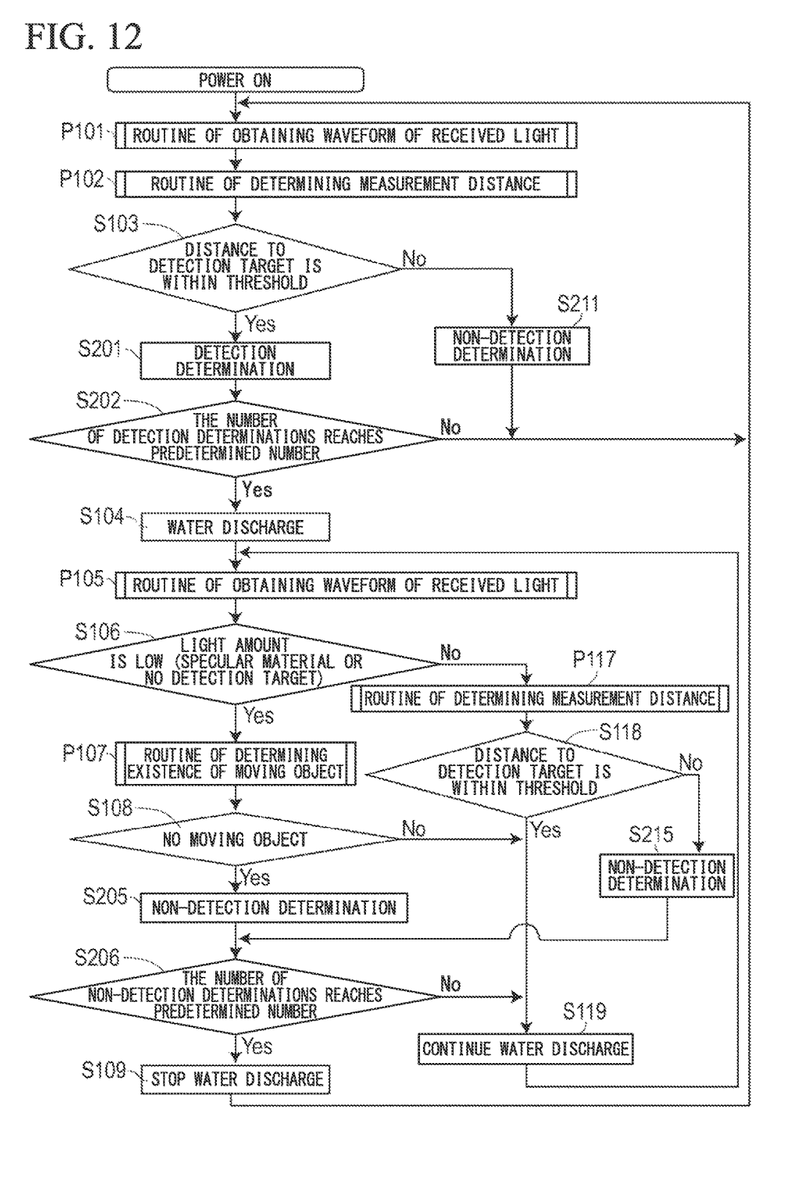
FIG. 12 is a flow diagram showing a flow of another detection process in Example 1.

Instead of the detection process of FIG. 8 of the present example, a detection process shown in the flowchart of FIG. 12 may be used. The detection process of FIG. 12 is different in the above-described detection process which switches the water discharge and the water stop immediately in response to the detection determination (YES in S103) or the non-detection determination (YES in S108) as shown in FIG. 8. In the detection process of FIG. 12, when the number of repetitions of the same determination reaches the predetermined number, the switching between the water discharge and the water stop is performed. According to such operational structure, it is possible to improve operational reliability by further suppressing malfunction of the faucet 16.

In the detection process of FIG. 12, program routines or step processes of the 200s such as S201, S202 . . . are added to the detection process of FIG. 8.

Steps S201, S202, and S211 relate to a detection process including the routine of determining measurement distance (P102) while the water stops (non-detection state). In the detection process, the routine of determining measurement distance is repeated until when the number of determinations that the detection object exists reaches the predetermined number (S202: NO). When the number reaches the predetermined number (S202: YES), it is determined to be in the detection state, and discharging the water is started (S104). When it is determined that there is no detection target in the routine of determining measurement distance while repeating the routine (S103: NO), it is determined to be in the non-detection state (S211), and the water is maintained to be stopped.

Steps S205, S206, and S215 relate to a detection process including the routine of obtaining waveform of received light (P105) while the water discharges (detection state). In the detection process, while the number of the non-detection determinations (S205, S215) does not reach the predetermined number (S206: NO), the water discharge state is maintained (S119). The non-detection determination in Step S205 of the routine of determining the existence of the moving object (P107) is based on a determination that there is no moving object (S108 YES). The non-detection determination in Step S215 of the routine of determining measurement distance (P117) is based on a determination that the distance to the detection target is not within a range of the predetermined detection distance (S118 NO).

On the other hand, when it is determined that there is an object to be detected in the routine of determining a measurement distance during the repetition (S118: No) or it is determined that there is a moving object in the routine of determining the existence of the moving object (S108: NO), the water discharge is continued (S119).

Example 2

The present example shows an example of a modified detection process using a human body sensor based on an automatic faucet described in Example 1. The details are described with reference to flowcharts described in FIGS. 13 and 14.

Figure 13:
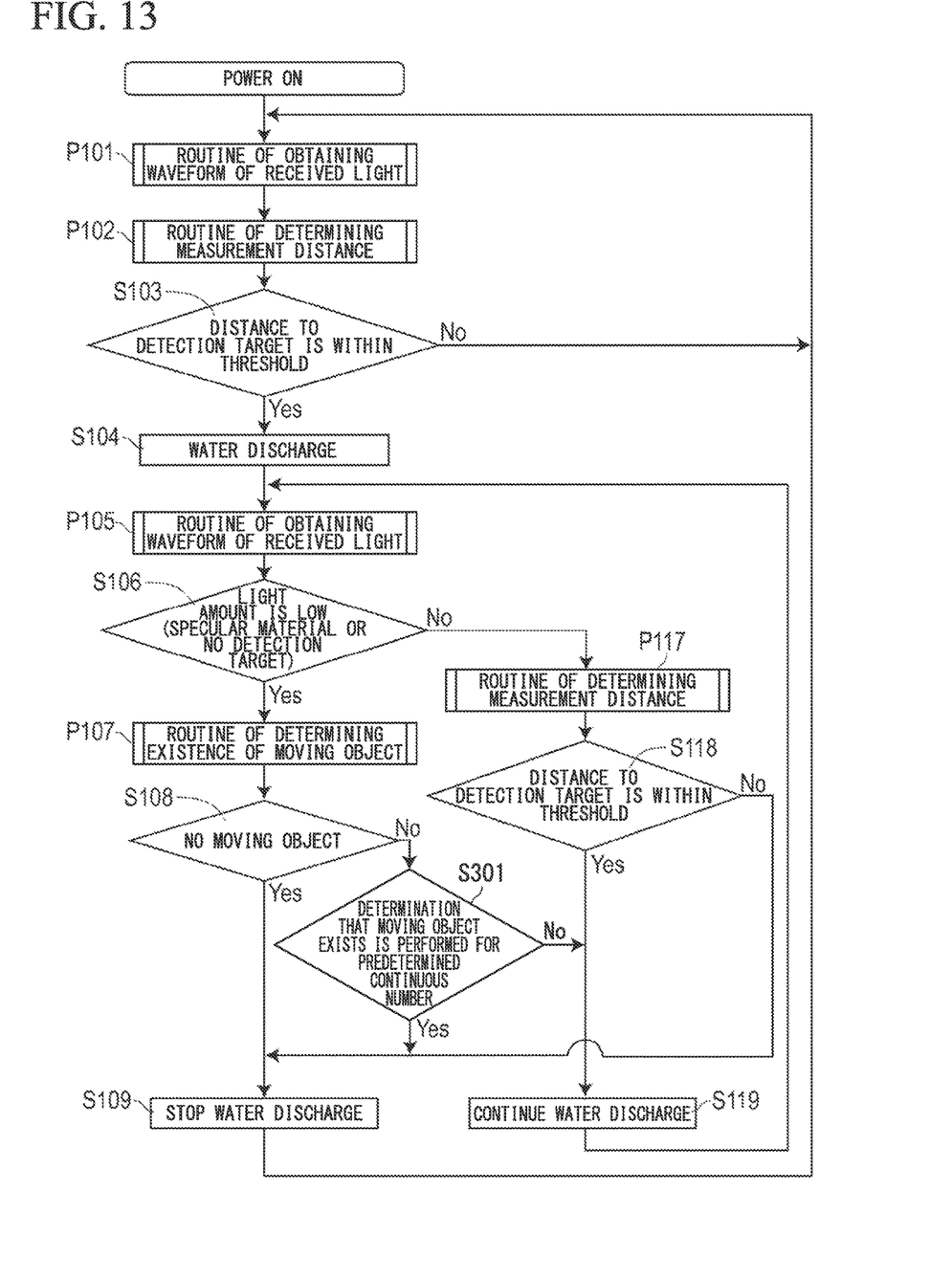
FIG. 13 is a flow diagram showing a flow of a detection process in Example 2.
Figure 14:
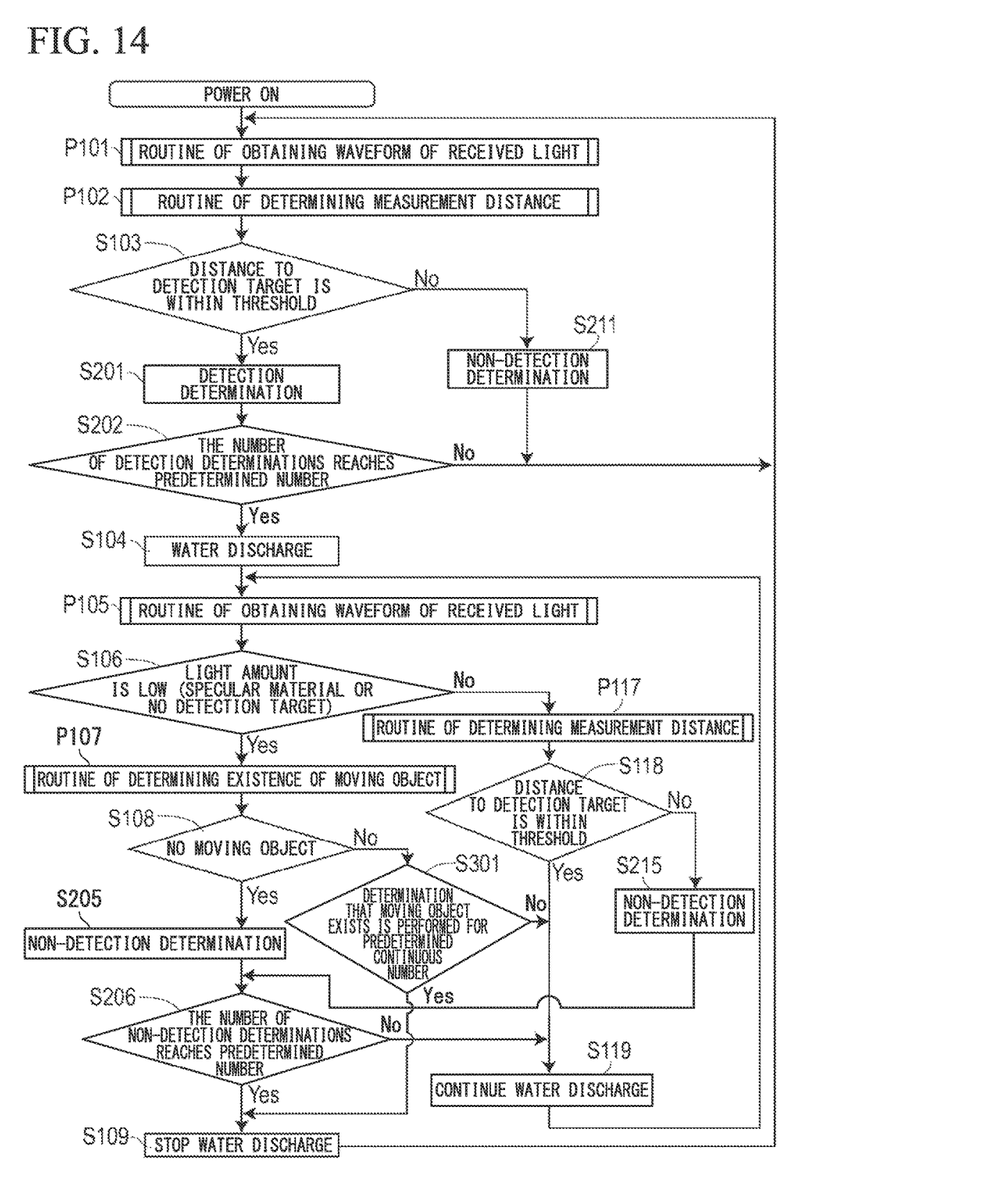
FIG. 14 is a flow diagram showing a flow of another detection process in Example 2.

The flow diagrams of FIGS. 13 and 14 show processes where the determination in Step S301 is respectively added to the flow diagrams of FIG. 8 and FIG. 12. This step S301 is a process executed when it is determined that the moving object exists (S108: NO) although the amount of reflected light is insufficient while discharging water (detection state) (S104→S106: YES).

As a situation where the amount of the reflected light during discharging water is insufficient, for example, while washing a glass cup using a faucet for kitchen use, sufficient reflected light does not return since the projected light (LED light) transmits the cup. In such situation, if the water discharge is continued in response to the determination that there exists a moving object, stopping the water discharge during dishwashing can be avoided in advance, as described in Example 1.

In such a controlling structure; however, some inconveniences may be caused in the following situations. In particular, it indicates a situation such that a bowl and the like is disposed in a sink for storing washing water after the washing operation has been completed and is left as it is. In this situation, while the reflected light of low light amount is returned since incomplete reflection occurs at the water surface in the bowl, there is a possibility that the determination which the moving object exists is repeated by vibrations of the water surface. In such a case, although the washing operation has been completed, the water discharge is continued since the determination of the non-detection state is not performed.

For such situations in which the water discharge is continued, the process of Step S301 of the present example works effectively that is a threshold determination regarding the repeated number of the determination which determines the moving target exists. In the situation that a bowl filled with water and the like is left in the sink, since the continuous number of the determination that the moving object exists is over the threshold, it is determined to be in a non-detection state by the determination of YES in Step S301, and switching to stopping water can be realized. It should be noted that in the present example, the threshold (the predetermined number of times) with respect to the continuous number of the determination that the moving object exists is set to be three.

On the other hand, while washing a glass cup and the like, due to the motion of a glass cup, the hand motion while dishwashing or the like, a situation that the sufficient reflected light is returned and a situation that the sufficient reflected light is not returned appear alternately and repeatedly. Therefore, during dishwashing and the like, the possibility of continuously occurring the determination such that while the amount of reflected light is insufficient, the moving object exists is reduced. Therefore, the possibility of occurring failures is low even when an upper limit with respect to the continuous number of the determination that the moving object exists is set, and the water is not stopped during dishwashing.

Other structures and effects are the same as described in Example 1.

The process in step S301 of the present Example is a threshold determination process regarding the number of the consecutive determination that there exists a moving object in step S108. In the present example, the processing routines of FIGS. 13 and 14 are performed at a period of approximately 200 msec. Therefore, the continuous number of times of three which is a threshold value corresponds to approximately 0.6 seconds (200 msec×3 times).

Instead of the threshold determination regarding the continuous number of times, a threshold determination regarding the duration of a circumstance which is determined in step S108 that the moving object exists may be executed. The predetermined time as the threshold can be set, for example, to be approximately 0.6 seconds The value for the predetermined time or the predetermined number of times as the threshold is not limited to this example. The value may be appropriately set in according with usage conditions and the like.

An operation unit which adjusts the predetermined time or the predetermined number may be provided. By providing such operation unit, it is possible to set a threshold value which matches the usage or the user's preference.

While detailed examples of the present invention have been described and illustrated above in detail, these examples merely disclose exemplary of the art included in the scope of the claims. It should be understood that these examples are not to be considered as limiting the scope of claims by the structures, values and the like in the detailed examples. The scope of claims includes the art which is modified, converted, or combined the examples described above by employing the known art or the knowledge of a person skilled in the art and the like.

DESCRIPTION OF THE REFERENCE SYMBOLS

1 . . . human body detection sensor, 15 . . . kitchen counter, 16 . . . faucet (automatic faucet), 11 . . . solenoid (water supply controller), 12 . . . water supply pipe, 167 . . . touchless sensor, 2 . . . sensor unit, 25A, 25B . . . light emitting unit, 251 . . . LED element, 26 . . . imaging unit (light reception unit), 260 . . . pixel, 261 . . . line sensor (imaging device), 263 . . . light reception region, 3 . . . control unit, 30 . . . control board, 31 . . . imaging control unit, 311 . . . imaging controller, 312 reader, 32 . . . detection processing unit, 321 . . . distance measurement determiner, 322 . . . moving object determiner, 324 . . . detection determiner, 325 . . . detection output portion, 33 . . . water supply control unit

The invention claimed is:

1. A human body sensor which is a photoelectric sensor, the human body sensor comprising:
a light emitting portion that projects a light to a detection target
a light reception portion that receives a reflected light of the light projected from the light emitting portion;
a light reception amount determiner that determines whether an amount of the reflected light received by the light reception portion has a value of a predetermined threshold or more or a value less than the predetermined threshold;
a distance measurement determiner that calculates a distance index representing a distance to the detection target on the basis of an incident position of the reflected light entering the light reception portion, and that determines whether the detection target exists on the basis of whether the distance index falls within a predetermined range;
a moving object determiner that determines that a moving object exists when a change of an incident position of the reflected light obtained in temporally distinct measurements has values of a predetermined threshold or more; and
a detection determiner that determines whether a state is a detection state where the detection target is detected or a non-detection state where the detection target is not detected, wherein
when an amount of the reflected light which has been received by the light reception portion is the predetermined threshold or more under the detection state, the detection determiner determines to switch the determination from the detection state to the non-detection state under a condition that the distance measurement determiner determines that the detection target does not exist, and
when an amount of the reflected light which has been received by the light reception portion is less than the predetermined threshold under the detection state, the detection determiner determines to switch the determination from the detection state to the non-detection state under a condition that the moving object determiner determines that the object does not exist wherein
when the amount of the reflected light which has been received by the light reception portion is less than the predetermined threshold, and
when the moving object determiner determines that the moving object exists,
the detection determiner determines to switch the determination from the detection state to the non-detection state under a condition that the determination by the moving object determiner occurs continuously over a predetermined number of times or the determination by the moving object determiner is maintained continuously over a predetermined time.

2. A human body sensor which is a photoelectric sensor, the human body sensor comprising:
a light emitting portion that projects a light to a detection target
a light reception portion that receives a reflected light of the light projected from the light emitting portion;
a light reception amount determiner that determines whether an amount of the reflected light received by the light reception portion has a value of a predetermined threshold or more or a value less than the predetermined threshold;
a distance measurement determiner that calculates a distance index representing a distance to the detection target on the basis of an incident position of the reflected light entering the light reception portion, and that determines whether the detection target exists on the basis of whether the distance index falls within a predetermined range;
a moving object determiner that determines that a moving object exists when a change of an incident position of the reflected light obtained in temporally distinct measurements has values of a predetermined threshold or more; and
a detection determiner that determines whether a state is a detection state where the detection target is detected or a non-detection state where the detection target is not detected, wherein
when an amount of the reflected light which has been received by the light reception portion is the predetermined threshold or more under the detection state, the detection determiner determines to switch the determination from the detection state to the non-detection state under a condition that the distance measurement determiner determines that the detection target does not exist, and
when an amount of the reflected light which has been received by the light reception portion is less than the predetermined threshold under the detection state, the detection determiner determines to switch the determination from the detection state to the non-detection state under a condition that the moving object determiner determines that the object does not exist; wherein
the light emitting portion comprises
a first light emitting portion that is horizontally oriented with the light reception portion and that projects a slit light in which a light spreading to a horizontal direction of the first light emitting portion and the light reception portion is reduced, and
a second light emitting portion that projects a light spreading at least to the horizontal direction,
the light reception portion has positional pixels in the horizontal direction regarding the incident position of the light entering the light reception portion,
the distance measurement determiner calculates the distance index on the basis of the incident position of the reflected light of the light projected from the first emitting portion, and
the moving object determiner determines whether the moving object exists on the basis of a change of an incident position of the reflected light of the light projected from the second light emitting portion, the change of the incident position of the reflected light obtained in temporally distinct measurements.

3. The human body detection sensor according to claim 2, wherein the moving object determiner determines whether a moving object exists by comparing two waveforms of the received light which are obtained by two temporally consecutive imaging operations.

4. The human body detection sensor according to claim 2, wherein the first light emitting portion, the second light emitting portion, and the light reception portion are accommodated in a housing, and the second light emitting portion is arranged in a gap formed between the first light emitting portion and the light reception portion.

* * * * *